No. 799,162. PATENTED SEPT. 12, 1905.
P. A. HÖRMANN.
WAFFLE IRON.
APPLICATION FILED DEC. 22, 1904.
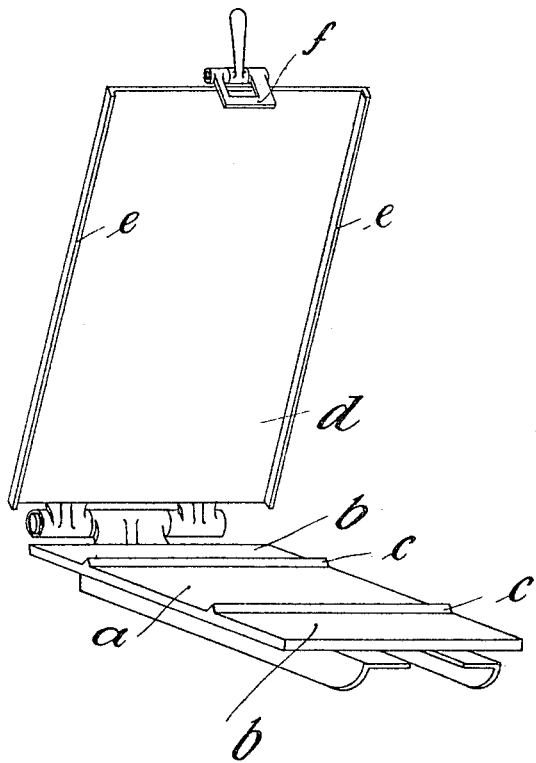

UNITED STATES PATENT OFFICE.

PAUL ADOLF HÖRMANN, OF DRESDEN-MICKTEN, GERMANY.

WAFFLE-IRON.

No. 799,162.           Specification of Letters Patent.           Patented Sept. 12, 1905.

Application filed December 22, 1904. Serial No. 237,891.

*To all whom it may concern:*

Be it known that I, PAUL ADOLF HÖRMANN, a subject of the German Emperor, residing at Dresden-Mickten, Germany, have invented certain new and useful Improvements in Waffle-Irons, of which the following is a specification.

The present invention relates to an improved utensil for making waffles.

Ordinary waffle-irons, as is well known, consist of two iron or steel plates hinged together at one end. The batter is poured onto the bottom plate and the top plate then closed down upon it, whereupon the utensil is placed in the oven. The batter at once commences to rise, and that portion of it which finds no accommodation in the iron spurts out at the ends, which are open, only the sides being closed by the overlapping edges of the top plate. The surplus batter adheres to the edges of the iron in the form of sticky lumps, which can only be used as pig's food, so that they represent an essential loss to the baker. This defect is entirely overcome by means of the present invention.

One form of the improved waffle-iron is shown on the accompanying drawing, which represents a perspective view in open position.

In the new waffle-iron the plates at the open ends are extended beyond the actual waffle-baking surface, so that at either end of the latter a margin is presented. This marginal surface is separated from the central baking-surface by means of a sharp ridge, rib, or the like of a height as to not touch the top plate when closed. The great advantages of such an arrangement are obvious. The batter not being able to directly spurt out is forced against the inner wall of the ridges, where it accumulates and is compelled before it can escape to properly cover the entire waffle-baking surface, thus preventing the formation of imperfect waffles. Hitherto, on the contrary, there has been no way of insuring a perfectly-formed waffle, as far as I am aware, since by pouring on more batter too considerable an amount of material is wasted. Thus according to the new invention despite a relatively moderate amount of batter a fully-formed cake is obtained. Moreover, such batter as does find its way over the ridges is by no means lost or practically lost, as hitherto, since it is caught up by the marginal extensions of the utensil and is thus baked also. Such baked portions can by reason of the sharp ridge be separated readily from the actual cake and can be sold for human consumption as waffle-scraps, so that there results an essentially larger profit to the baker than has hitherto been the case.

The marginal extensions, which may be of any desired breadth, may present a pattern, for example, of the same design as the central baking-surface. The ridges may suitably be of steel and can take the form of a sharp-edged triangular rib. They may be secured to the surface of the plate or let into the latter or may be made in one piece with the plate.

The invention may be applied to waffle-irons of all shapes and types, and it is naturally a matter of indifference what system of baking is adopted.

Referring to the drawing, $a$ is the bottom plate, provided with marginal extensions $b$, separated from the central baking-surface by the sharp ridges or ribs $c$.

$d$ is the top plate, furnished with lateral flanges $e$ and hinged to the bottom plate at one end and held to it by a spring-catch $f$ or the like at the other end.

What I claim is—

1. In a waffle-iron, the combination of the baking-surface proper, an extension on either open side of the actual baking-surface, means to separate said extensions from the actual baking-surface, and a flanged cover-plate, covering said baking-surface proper and said extensions, substantially as and for the purpose set forth.

2. In a waffle-iron, the combination of the baking-surface proper, an extension on either open side of the actual baking-surface, means to separate said extensions from the actual baking-surface, a flanged cover-plate, covering said baking-surface proper and said extensions, and means for temporarily locking said cover in the closed position, substantially as and for the purpose set forth.

3. In a waffle-iron, the combination of the bottom plate, comprising the baking-surface proper, an extension on either open side thereof, a flanged cover-plate covering the said bottom plate, and sharp-edged means dividing the said baking-surface proper from said extensions, and not touching said top plate, when closed, substantially as and for the purpose set forth.

In testimony whereof I affix my signature in presence of two witnesses.

PAUL ADOLF HÖRMANN.

Witnesses:
    C. H. SCHILLING,
    FRANK SIMON.